US010754829B2

(12) United States Patent
West et al.

(10) Patent No.: US 10,754,829 B2
(45) Date of Patent: Aug. 25, 2020

(54) VIRTUAL CONFIGURATION SYSTEMS AND METHODS

(71) Applicant: Oracle International Corporation, Redwood Shores, CA (US)

(72) Inventors: Christopher West, Longmont, CO (US); Kaustubh Deshpande, Superior, CO (US); Terry Schmitt, Aurora, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 395 days.

(21) Appl. No.: 15/479,085

(22) Filed: Apr. 4, 2017

(65) Prior Publication Data
US 2018/0285385 A1 Oct. 4, 2018

(51) Int. Cl.
*G06F 16/188* (2019.01)
*G06F 9/4401* (2018.01)
*G06F 16/182* (2019.01)
*G06F 9/445* (2018.01)

(52) U.S. Cl.
CPC .......... *G06F 16/188* (2019.01); *G06F 9/4406* (2013.01); *G06F 9/44505* (2013.01); *G06F 16/183* (2019.01); *G06F 9/4416* (2013.01)

(58) Field of Classification Search
CPC .............................. G06F 16/188; G06F 16/183
See application file for complete search history.

(56) References Cited

U.S. PATENT DOCUMENTS

| 7,962,737 | B2 * | 6/2011 | Lo | G06F 9/4416 |
| | | | | 713/1 |
| 2002/0174215 | A1 | 11/2002 | Schaefer | |
| 2003/0110173 | A1 * | 6/2003 | Marsland | G06F 9/45533 |
| 2003/0195995 | A1 * | 10/2003 | Tabbara | G06F 8/60 |
| | | | | 719/313 |
| 2004/0153640 | A1 * | 8/2004 | Sugita | G06F 21/105 |
| | | | | 713/2 |
| 2004/0205179 | A1 * | 10/2004 | Hunt | G06F 8/65 |
| | | | | 709/223 |
| 2004/0268340 | A1 * | 12/2004 | Steeb | G06F 8/60 |
| | | | | 717/174 |
| 2005/0114595 | A1 | 5/2005 | Karr et al. | |

(Continued)

OTHER PUBLICATIONS

International Application No. PCT/US2018/020364, International Search Report and Written Opinion dated May 29, 2018, 12 pages.

*Primary Examiner* — Jensen Hu
(74) *Attorney, Agent, or Firm* — Kilpatrick Townsend & Stockton LLP

(57) ABSTRACT

Some embodiments of the present invention provide virtual configuration systems and methods that overcome some or all of the downfalls of typical approaches by allowing for persistent configuration of an operating system of a host device. A virtual configuration layer may be incorporated into the file system of the host device and executed to modify configuration data stored outside of the file system, without changing the file system. Once the configuration data is modified, it may be used to configure the file system and/or the operating system of the host device when it is loaded by a client device. In some embodiments, the host device may be nonvolatile storage (e.g., a flash drive) embedded into a client device (e.g., a diskless system).

20 Claims, 9 Drawing Sheets

(56) References Cited

U.S. PATENT DOCUMENTS

| | | | |
|---|---|---|---|
| 2007/0100929 A1* | 5/2007 | DeRobertis | G06F 21/31 709/200 |
| 2007/0214348 A1* | 9/2007 | Danielsen | G06F 9/4416 713/2 |
| 2008/0028052 A1* | 1/2008 | Currid | G06F 9/4416 709/222 |
| 2008/0133902 A1 | 6/2008 | Love | |
| 2008/0289040 A1 | 11/2008 | Ithal | |
| 2009/0204709 A1 | 8/2009 | Yodaiken | |
| 2010/0058042 A1* | 3/2010 | Locker | G06F 9/4416 713/2 |
| 2010/0174894 A1 | 7/2010 | Chen et al. | |
| 2011/0040812 A1 | 2/2011 | Phillips | |
| 2011/0296159 A1* | 12/2011 | Hong | G06F 9/4416 713/2 |
| 2015/0331694 A1 | 11/2015 | Balakrishnan et al. | |
| 2017/0220796 A1 | 8/2017 | Cath et al. | |

* cited by examiner

VIRTUAL CONFIGURATION SYSTEMS AND METHODS

FIELD

The present disclosure generally relates to storage systems, and more specifically to virtual configuration systems and methods for implementing changes in a file system.

BACKGROUND

A diskless system may execute on a file system that has been unpacked into memory. Changes to the file system (configuration or otherwise) may not persist across a reboot or reload of the file system because it is loaded from an external source. Typically, a user may change a file and the change persists. In order to make a persistent change in the diskless case, the source of the file system must be mounted on another system, modified, and unmounted. The resultant image is then uploaded to replace the image for the diskless system. This may make changes to the file system time consuming.

BRIEF SUMMARY

Provided are methods, including computer-implemented methods, devices including storage devices, and computer-program products applying virtual configuration for changing addressing methods.

According to some embodiments of the invention, a method is provided. The method comprises receiving, at an operating system of a host device, a request to load a file system from nonvolatile storage of the host device into volatile memory of a client device. The method further comprises, in response to receiving the request, determining, by the operating system of the host device, that the operating system is not executing on the client device. The method further comprises, in response to determining that the operating system is not executing on the client device: retrieving, by the host device, configuration data for the operating system from a datastore, and configuring, by the host device, the operating system in accordance with the configuration data. The datastore is located outside of the file system. The method further comprises facilitating, by the host device, loading of the file system into the volatile memory of the client device. The operating system is executing while the file system is loaded on the client device.

According to some embodiments of the invention, a method is provided. The method comprises detecting an event that triggers loading of a file system from nonvolatile storage into volatile memory of a diskless system. The nonvolatile storage is embedded in the diskless system. In response to detecting the event, the method further comprises retrieving configuration data for an operating system from a datastore, wherein the datastore is located outside of the file system, and wherein the operating system is stored in the nonvolatile storage, and configuring the operating system in accordance with the configuration data. The method further comprises facilitating loading of the file system from the nonvolatile storage into the volatile memory of the diskless system, wherein the operating system is executing while the file system is loaded on the diskless system.

According to some embodiments of the invention, a device is provided. The device comprises one or more processors. The device further comprises a non-transitory computer-readable medium containing instructions that, when executed by the one or more processors, cause the one or more processors to perform operations including the steps of the methods described herein.

According to some embodiments of the invention, a computer-program product is provided. The computer-program product is tangibly embodied in a non-transitory machine-readable storage medium of a device. The computer-program product includes instructions that, when executed by one or more processors, cause the one or more processors to perform operations including the steps of the methods described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
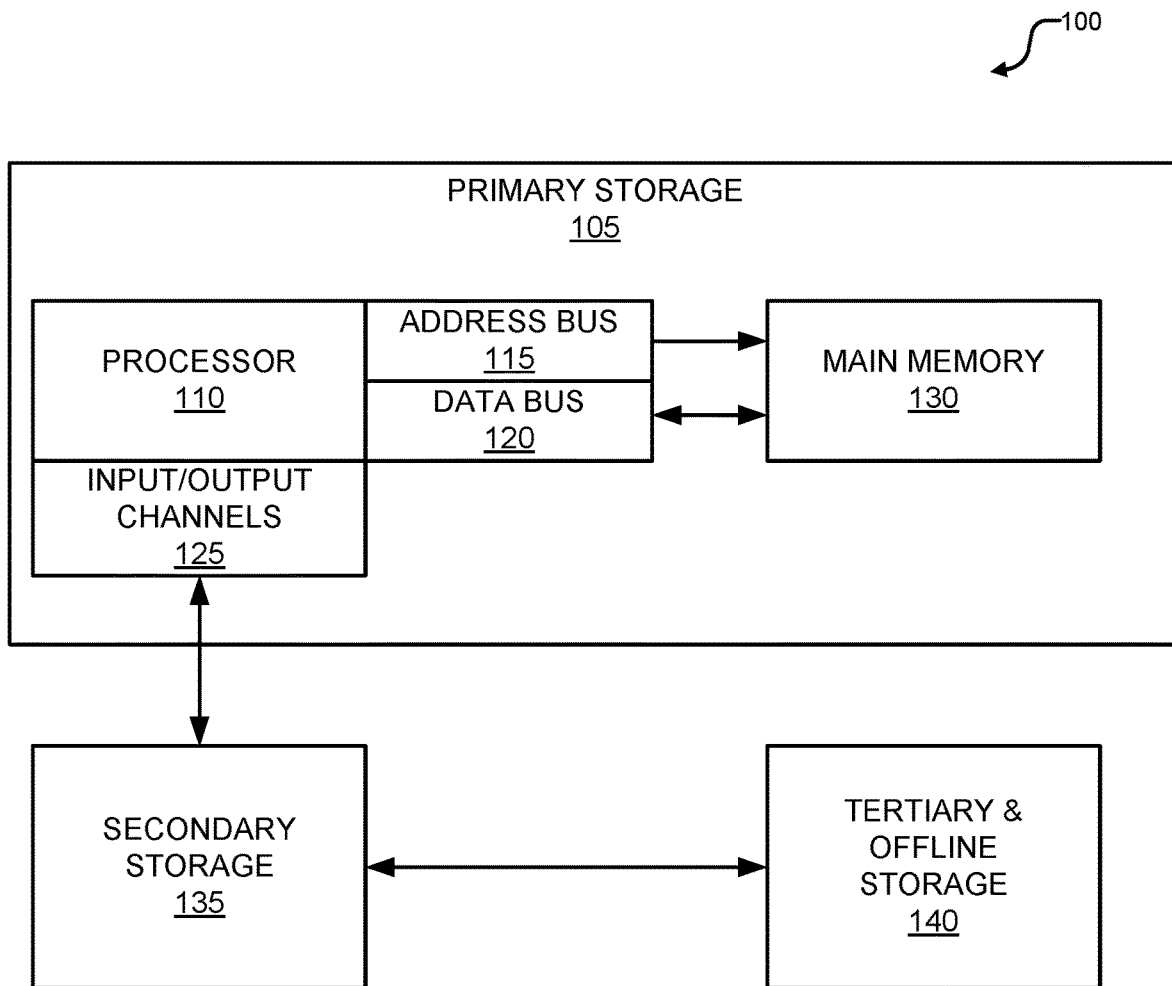
FIG. 1 is a block diagram illustrating a data storage system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Data Storage Systems

Data storage systems may include any separate or combined storage devices and/or components that are used to retain, and in some cases process, data. Without data storage systems, computing devices would be limited to the performance of certain operations and would have to immediately output the result. The use of data storage systems may allow computing devices to perform a wider range of operations, store and reference the results of performed operations (either short-term or long-term), and store and execute specialty applications for a variety of purposes. As used herein, a "storage device" may be any component or combination of components used to retain data in a data storage system.

FIG. 1 is a block diagram illustrating a data storage system 100, in accordance with some embodiments. The data storage system 100 may be included, in whole or in part, in one or more computing devices, such as personal computers (e.g., clients) or servers (e.g., hosts). The data storage system 100 may include primary storage 105, secondary storage 135, and tertiary & offline storage 140. Although shown and described as including these three different types of storage, it is contemplated that the data storage system 100 may implement more or less different types of storage, either separately or in combination. Further, although shown and described as including one of each of these different types of storage, it is contemplated that none or more than one of the different types of storage may be included. For example, in some embodiments, more than one storage device may be included in secondary storage 135.

Primary storage 105 may include a processor 110 (or more than one processor 110) and main memory 130. As used herein, "a" processor or "the" processor may refer to one or more processors. The processor 110 may be or include, for example, a central processing unit (CPU). The processor 110 may retrieve and manipulate data stored in the data storage system 100. Thus, in general, data stored in the data storage system 100 in close proximity to the processor 110 may be retrieved and processed fastest, while data stored in the data storage system 100 further from the processor 110 may be processed slower. However, frequently, some configurations can result in only a small amount of data being available to be stored in close proximity to the processor 110 (and in some embodiments, only temporarily), while larger storage options may generally be positioned further from the processor 110 (and may be used to permanently store data).

The processor 110 may include its own memory (not shown). The memory of processor 110 may include one or more processor registers and one or more processor caches. The processor registers may hold a small discrete amount of data (e.g., 8, 32 or 64 bits). The processor registers may take on any of a number of forms. For example, the processor registers may include one or more data registers. The processor 110 may load data from larger storage in the data storage system 100 (e.g., main memory 130) into the data registers to perform operations or manipulations on the data. The data may then be stored back to the larger storage (e.g., main memory 130). In another example, the processor registers may include one or more address registers. The address registers may hold addresses for data that may be requested by executed instructions. In still another example, the processor registers may include one or more general purpose registers. The general purpose registers may be combination registers that may store data and/or addresses. Other types of registers that may be alternatively or additionally included in the processor registers include floating point registers, status registers, constant registers, vector registers, special purpose registers, machine specific registers, internal registers, and the like. The processor registers may be the fastest type of storage available in the data storage system 100 due to its location inside the processor 110, but may be limited by a small amount of data.

The processor 110 may also include one or more processor caches. The processor caches may include one or more data caches. The data caches may store data that is frequently used. The processor caches may alternatively or additionally include one or more instruction caches. The instruction caches may store executable instructions that are frequently used. The processor caches may alternatively or additionally include a translation lookaside buffer. The translation lookaside buffer may be used to expedite virtual-to-physical address translation for executable instructions and data. Although the processor caches are also located inside the processor 110, they may be slower than the processor registers. However, the processor caches may be preferable over the main memory 130 for storage of actively or commonly used data or instructions in small amounts, as the processor caches may be accessed faster than the main memory 130.

The processor 110 may be directly or indirectly coupled to the main memory 130 over an address bus 115 and a data bus 120. When requesting certain data from the main memory 130, the processor 110 may send a memory address to the main memory 130 over the address bus 115. The memory address may indicate the location of the data being requested. The processor 110 may then read the data from the main memory 130 over the data bus 120. The processor 110 may alternatively or additionally write data to the main memory 130 over the data bus 120.

The main memory 130 may include, for example, random access memory (RAM), such as dynamic RAM (DRAM), static RAM (SRAM), synchronous DRAM (SDRAM), or any other type of volatile storage. "Volatile" storage, as used herein, may refer to a characteristic of storage devices that do not retain their contents when not supplied with power and thus are uninitialized upon booting up (e.g., temporary storage). In other words, volatile storage may require a constant source of power to retain stored data. Although the main memory 130 may be volatile, access to data stored therein is generally faster than that stored in secondary storage 135 or tertiary & offline storage 140 due to its close proximity to the processor 110. In some embodiments, the primary storage 105 may also include non-volatile storage, such as read only memory (ROM).

The processor 110 may use input/output channels 125 to access the secondary storage 135. The secondary storage 135 may include, for example, hard disk drives, flash memory, or any other type of non-volatile storage. "Non-volatile" storage, as used herein, may refer to a characteristic of storage devices that retain their contents when powered down, and data may be stored therein temporarily or permanently. The secondary storage 135 may have one or more file systems stored thereon that may provide a hierarchy of files and directories stored in the secondary storage 135, as described further herein with respect to FIG. 3. In some embodiments, the secondary storage 135 may also include volatile storage, such as RAM disks.

In some embodiments, the primary storage 105 is collocated with the secondary storage 135, e.g., on a single computing device. However, it is contemplated that in some embodiments, the primary storage 105 may be located remotely from the secondary storage 135, e.g., on two or more different computing devices. For example, the secondary storage 135 may be located at a host, while the primary storage 105 may be located at a client. The client may issue commands to retrieve and access data stored on the secondary storage 135 at the host using the processor 110 of the primary storage 105 at the client.

Tertiary & offline storage 140 may include tertiary storage, such as removable mass storage media used to store large amounts of data that is not accessed often, but may be accessed without human intervention using robotic technologies. Tertiary & offline storage 140 may alternatively or additionally include offline storage, such as removable storage media that may not be accessed without human intervention, such as CD-ROMs, CD-RWs, DVDs, floppy disks, Universal Serial Bus (USB) flash drives, and the like. Offline storage may be recorded and physically disconnected from the data storage system 100. Although shown as being in communication with the secondary storage 135, it is contemplated that the tertiary & offline storage 140 may alternatively or additionally be in direct communication with the primary storage 105.

File Systems

Figure 2:
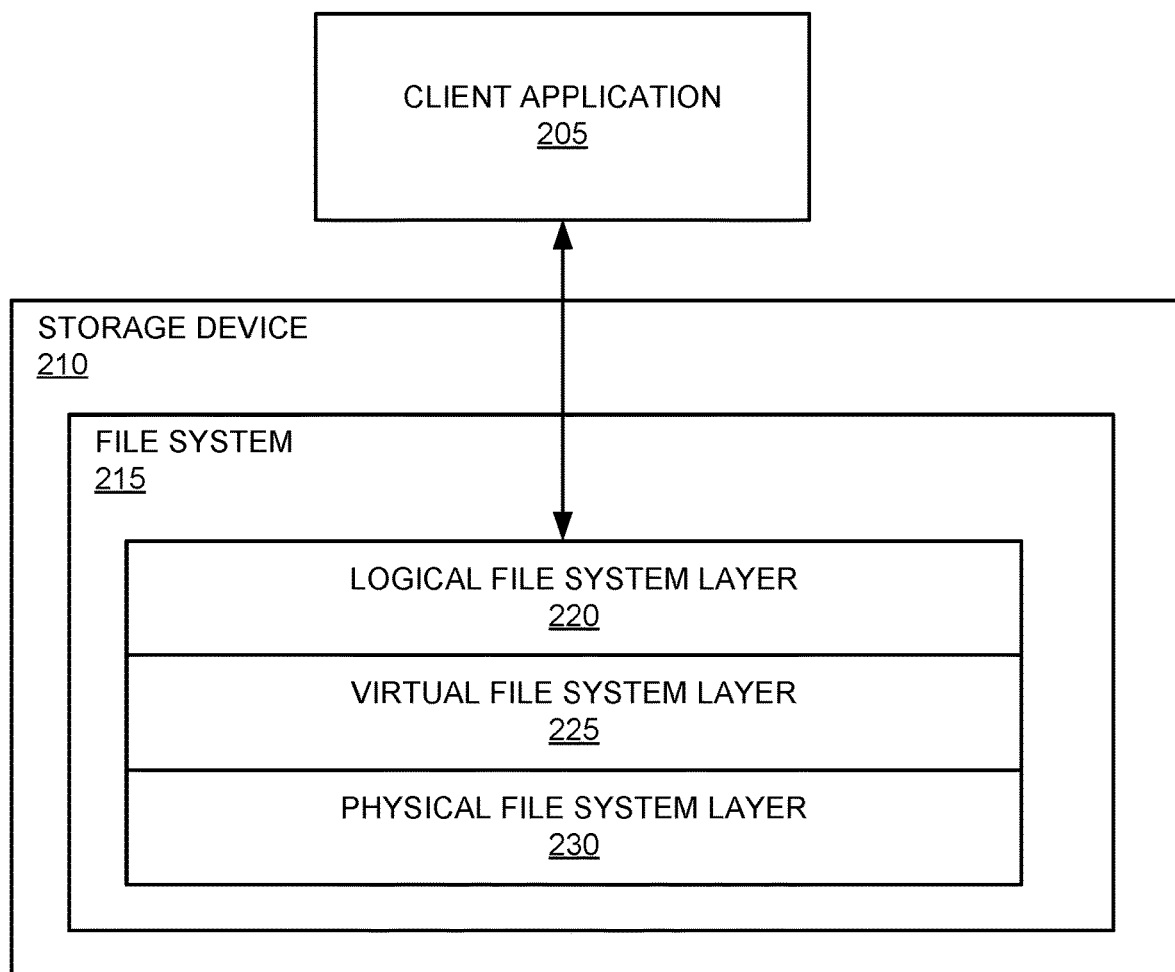
FIG. 2 is a block diagram illustrating the layers of a file system of a storage device, in accordance with some embodiments.
Figure 3:
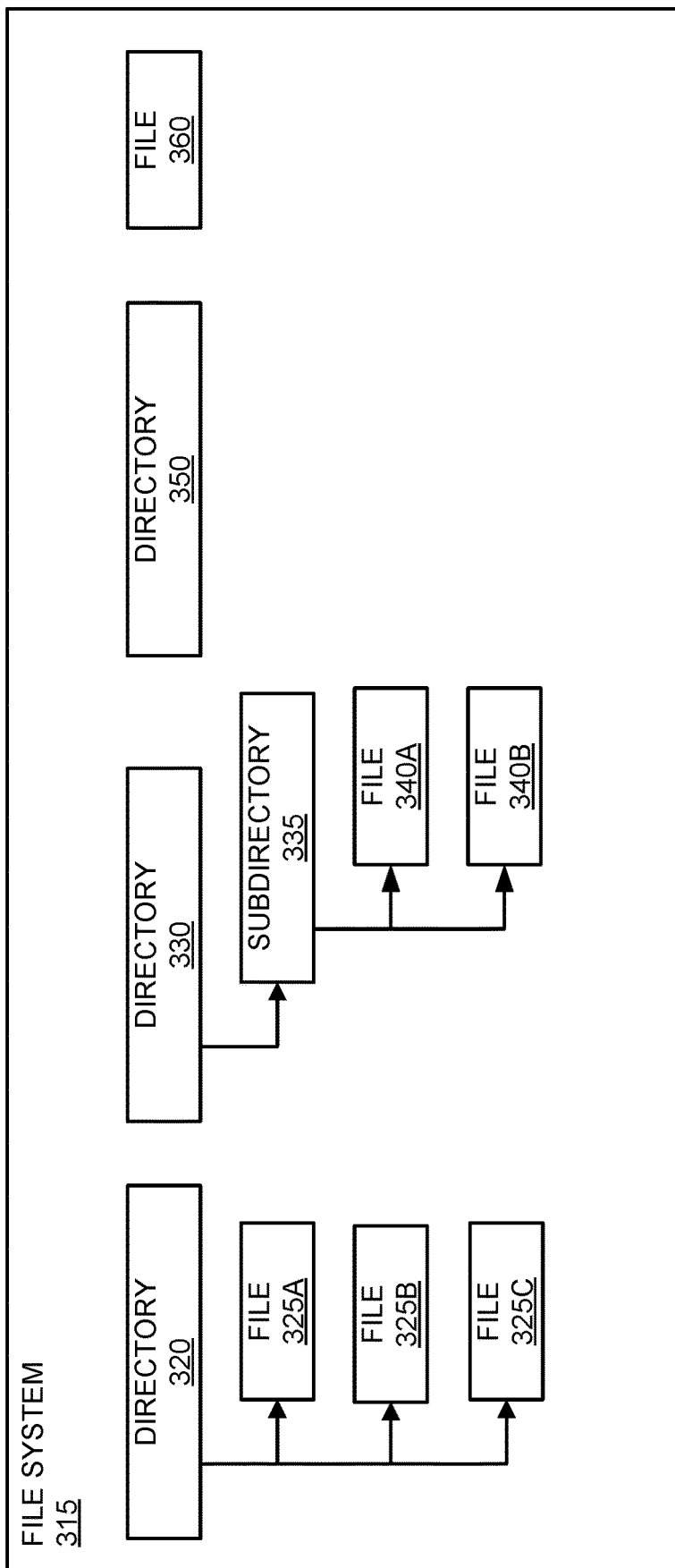
FIG. 3 is a block diagram illustrating a hierarchy for data stored or mounted in a file system, in accordance with some embodiments.

A storage device of a data storage system may implement one or more file systems to organize the data stored thereon. As used herein, a "file system" may refer to a structure or organization of files or directories, and a "file" may refer to a group of data. Each file may be associated with a filename that allows that file to be uniquely identified and located. A number of different file systems may be used depending on the specific requirements and desired applications. FIGS. 2 and 3 illustrate exemplary file systems that may be implemented on a storage device.

FIG. 2 is a block diagram illustrating the layers of a file system 215 of a storage device 210, in accordance with some embodiments. The file system 215 may have three layers: a logical file system layer 220, a virtual file system layer 225, and a physical file system layer 230. Although shown and described as having these three layers, it is contemplated that fewer or more layers may be used. For example, in some embodiments, the functions of the logical file system layer 220, the virtual file system layer 225, and the physical file system layer 230 may be combined into a single layer. In some embodiments, the virtual file system layer 225 may be omitted.

The logical file system layer 220 may interact with the client application 205 to process requests for data. The logical file system layer 220 may provide the application programming interface (API) for file access and operations (e.g., open, close, read, write, etc.). The logical file system layer 220 may receive the requested operation and may pass it to the virtual file system layer 225 to be passed to the physical file system layer 230.

The logical file system layer 220 may provide a consistent view of multiple physical file systems that may be defined by multiple file system implementations. This consistency may be provided by the abstraction of the physical file system layer 230 that is implemented by the virtual file system layer 225. The abstraction may specify a set of operations that a given implementation should include in order to carry out file system requests received through the logical file system layer 220. Thus, the abstraction carried out by the virtual file system layer 225 may provide a uniform interface to the logical file system layer 220.

In other words, the virtual file system layer 225 may provide support for multiple different physical file systems. The virtual file system layer 225 may allow the client application 205 to access different types of file systems in a uniform way. For example, the virtual file system layer 225 may allow the client application 205 to access file systems on both local storage devices and network storage devices, file systems for different operating systems (e.g., Windows, Mac OS, Unix, etc.), file systems of different types (e.g., Unix file system (UFS), network file system (NFS), etc.), and the like.

The physical file system layer 230 may process the requested operation on a file (e.g., read, write, etc.). The physical file system layer 230 may physically place files in specific locations on the storage device 210. The physical file system layer 230 may interact with the drivers of the storage device 210 to physically operate the storage device 210.

FIG. 3 is a block diagram illustrating a hierarchy for data stored or mounted in a file system 315, in accordance with some embodiments. In some embodiments, data may be physically stored in the file system 315 according to the hierarchy shown in FIG. 3, such as in a Windows operating system (using file systems such as, e.g., FAT, NTFS, exFAT, Live File System, ReFS file system, etc.). In some embodiments, data may instead be physically stored under a single root directory. The file system 315 may be "mounted" by informing the operating system where in the hierarchy certain files should appear. These embodiments may be implemented in a Unix or Unix-like operating system.

The file system 315 may include one or more directories (e.g., directories 320, 330, 350), one or more subdirectories (e.g., subdirectory 335), and one or more files (e.g., files 325A-C, 340A-B, 360). Directories (which may also be referred to herein as "folders") may group files into separate collections. For example, directory 320 may include files 325A-C. Directories may also include subdirectories. For example, directory 330 may include subdirectory 335, and subdirectory 335 may include files 340A-B. Directories may also be created without any files (e.g., directory 350). Files may also be located in the file system 315 without an associated directory (e.g., file 360).

File (e.g., files 325A-C, 340A-B, 360) within the file system 315 may have associated metadata. The metadata may be stored separately from the file (not shown). The metadata may include, for example, the amount of data in the file, a file timestamp (e.g., the last time the file was modified, when the file was created, the time the file was last backed up, and/or when the file was last accessed), a user ID, access permissions, file attributes (e.g., read only, read/write, etc.), and the like.

Network Devices

Figure 4:
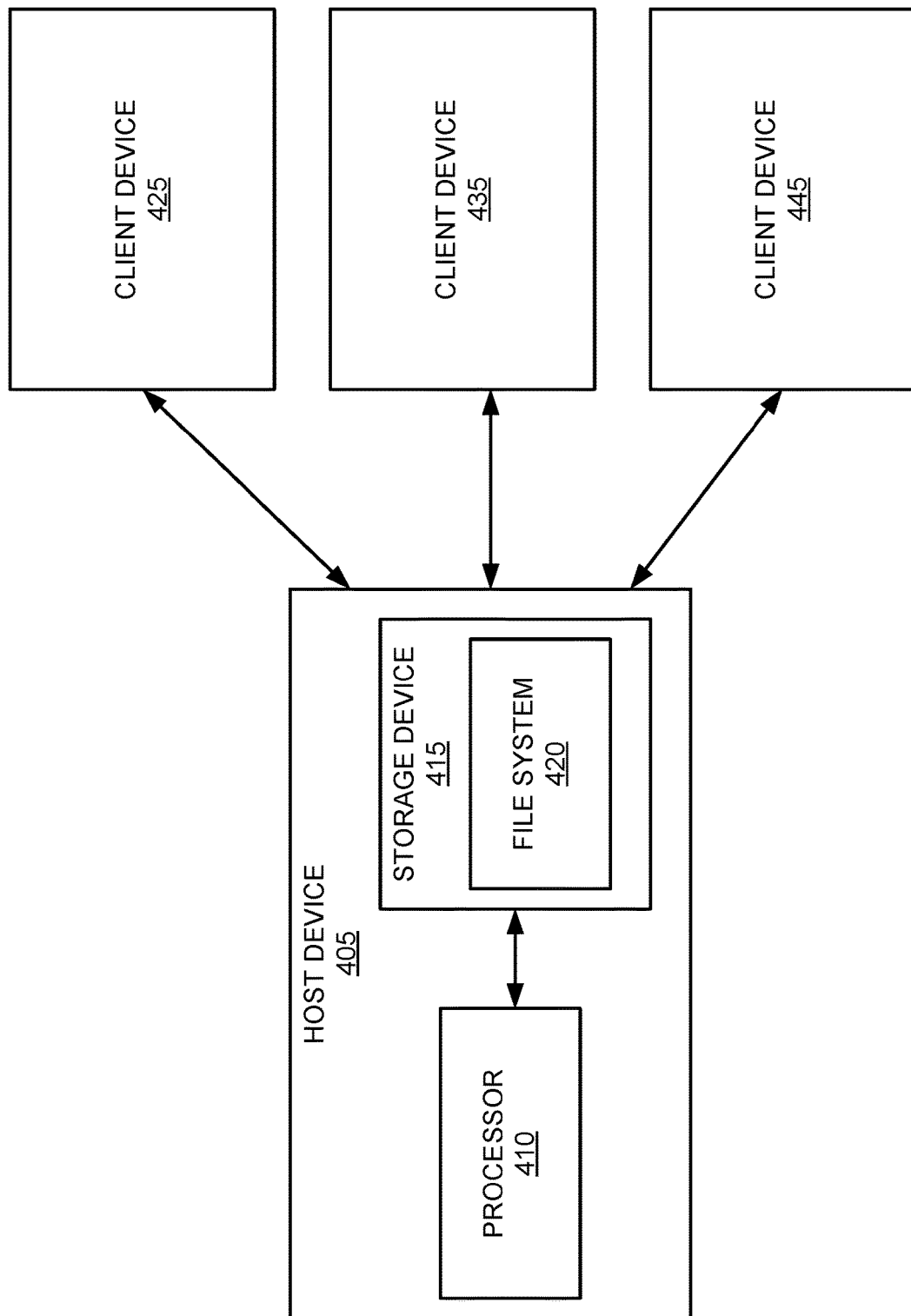
FIG. 4 is a block diagram illustrating a host device in a network, in accordance with some embodiments.

Data storage systems may be implemented as network devices accessible by client devices over a network. FIG. 4 is a block diagram illustrating a host device 405 in a network, in accordance with some embodiments. The host device 405 may be a host storage device, host computing device (e.g., a host server), and/or host data storage system. The host device 405 may include a processor 410 and storage 415. The processor 410 may be similar to the processor 110 of FIG. 1. The storage 415 may include primary storage 105, secondary storage 135, and/or tertiary & offline storage 140 of FIG. 1. The storage 415 may include a file system 420, which may be similar to file system 215 of FIG. 2 and/or file system 315 of FIG. 3. As discussed herein with respect to FIG. 1, it is contemplated that in some embodiments, processor 410 of host device 405 is not necessary, and respective processors of client devices 425, 435, 445 may be used to process requests for data from host device 405. As used herein, a "request" for data may include a mount. A mount may include a request to make a data object accessible to a user.

The host device 405 may communicate over a network with the client devices 425, 435, 445. As used herein, a "client device" may refer to any device requesting data from another device. It is contemplated that a client device may include a client application executing on the client device to facilitate the requesting, transfer, use and storage of data. The host device 405 may communicate with the client devices 425, 435, 445 through any standard data connection, including but not limited to an Internet connection. This may include a wireless channel (e.g., a Wi-Fi connection), a wired connection (e.g., DSL, cable modem, etc.), or a combination of both. The client devices 425, 435, 445 may utilize the host device 405 to store data, define rules, set permissions, and the like. The host device 405 may also be in communication with one or more user devices (not shown). The user devices may utilize the host device 405 to request and/or use data. In addition, although shown and described as being in communication with three client devices 425, 435, 445, it is contemplated that host device 405 may be in communication with any number of client devices in this embodiment.

The host device 405 may store data that may be requested by and transmitted to the client devices 425, 435, 445 for any purpose. In these embodiments, data that may be requested from the host device 405 may be referred to as a "share", i.e., a resource that may be made available by one device to other devices. For example, the client devices 425, 435, 445 may be requesting an application or service. In another example, the host device 405 may be performing migration of one or more files, file systems, and/or databases to one or more of client devices 425, 435, 445.

Diskless Systems

A diskless system is a device that does not have a physically rotating hard drive. However, a diskless system may include a removable storage device other than a hard drive, such as a CD-ROM drive or a flash drive. A diskless system may boot an operating system (e.g., a Linux operating system, a Windows operating system, a Solaris operating system, etc.) from a variety of file system sources. For example, a diskless system may boot from a storage device that is not physically rotating (e.g., a flash drive), a CD-ROM, ROM-based storage, and/or the like. In another example, a diskless system may load the kernel and the file system from a remote server (e.g., a remote NFS server) over a network. One of several different methods may be used to load the kernel and the file system from an NFS server: Bootstrap Protocol (BOOTP), Reverse Address Resolution Protocol (RARP), and/or Dynamic Host Configuration Protocol (DHCP).

Diskless systems present a number of advantages. For example, a network of any number of devices may need to access a same application. Instead of installing the application on each of the devices, the application may instead be installed on an NFS server on the same network. Diskless systems may then be booted and access the application from the NFS server. Another advantage includes decreased cost because the cost of a disk is removed from the system. This may be a major consideration in an embedded-type application where cost is a large factor. A tradeoff for this type of design may be that there is no persistence when volatile memory is used as the replacement.

Diskless systems may also present a number of challenges. A diskless system may execute an operating system of the NFS server to load an associated remote file system. In such a diskless system, a configuration change to the operating system (e.g., a change to a stored IP address used by the operating system) is usually made by changing a configuration file of the loaded file system. However, changes to configuration files within the file system do not persist across future loads of the file system, and changing the file system itself is time consuming because the file system change requires mounting it on another system, modifying it, unmounting it, and uploading the resultant image to the target system.

Figure 5A:
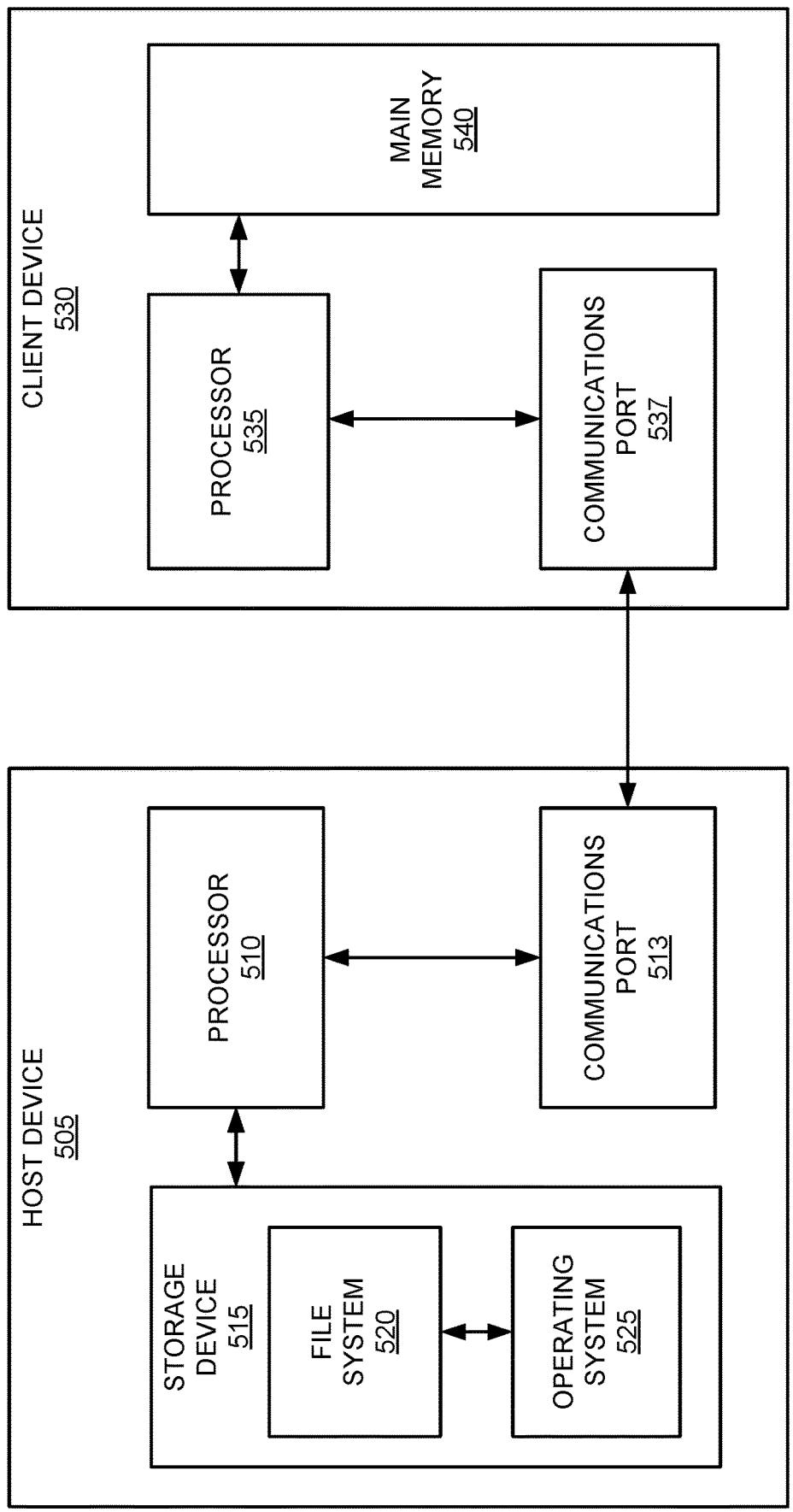
FIG. 5A is a block diagram illustrating a networked system for virtual configuration, in accordance with some embodiments.

FIG. 5A is a block diagram illustrating a networked system, in accordance with some embodiments. The networked system may include a host device 505 and a client device 530. The host device 505 may be in operative communication with the client device 530, such as, for example, over a network, or over any type of wired or wireless connection, such as a WiFi network, a local area network (LAN), a wireless LAN, a personal area network (PAN), a metropolitan area network (MAN), a wide area network (WAN), a storage area network (SAN), a system area network, and enterprise private network (EPN), a virtual private network (VPN), a cellular network, combinations thereof, and the like. The host device 505 may be, for example, an NFS server. The client device 530 may be, for example, a diskless system. Although shown as including a single host device 505 and client device 530, it is contemplated that any number of host devices and client devices may be included in the networked system illustrated in FIG. 5A, and may perform the functions of the host device 505 and the client device 530 described herein.

The host device 505 may include a processor 510. The processor 510 may be as described with respect to the processor 410 of FIG. 4 and/or the processor 110 of FIG. 1. The host device 505 may include a storage device 515 in operable communication with the processor 510. In some embodiments, the storage device 515 comprises nonvolatile memory (e.g., a hard drive). The storage device 515 may store a file system 520 and an operating system 525.

The operating system 525 may be any suitable operating system, such as a Linux operating system, a Windows operating system, a Solaris operating system, etc. The operating system 525 may be software run by the host device 505 that manages the hardware of host device 505 (e.g., the storage device 515, the processor 510, and the communications port 513) and other software. The operating system 525 may act as an intermediary between software and the hardware of the host device 505. The operating system 525 may implement a kernel, networking protocols, security protocols, and/or a user interface, in some embodiments.

The networking protocols of the operating system 525 may be used to communicate with the client device 530 via a communications port 513. The communications port 513 may provide any suitable wired or wireless connection to the communications port 537 of the client device 530. For example, the communications port 513 and the communications port 537 may support any of a number of networking protocols, including Ethernet, WiFi, cellular communications, fiber optics, and/or the like.

The client device 530 may be a diskless system that may include a processor 535, main memory 540 and the communications port 537. The processor 535 may be as described with respect to the processor 110 of FIG. 1. The main memory 540 may be as described with respect to the main memory 130 of FIG. 1. In some embodiments, the main memory 540 comprises volatile memory (e.g., RAM). In some embodiments, the client device 530 does not include a hard drive, but may include other forms of nonvolatile memory, as described further herein. In some embodiments, the client device 530 may be an embedded system.

In use, the client device 530 may boot the operating system 525 of the host device 505 and load the file system 520 of the host device 505 into the main memory 540. The client device 530 may have its own processor 535 and main memory 540 and can process data locally, but cannot operate if it is detached from the network or if the host device 505 malfunctions. The file system 520 may hold data and control how it is stored and retrieved by the operating system 525. The file system 520. The file system 520 may include a number of files, some of which may be used as configuration data for the operating system 525. For example, the file system 520 may include a file that stores IP addresses that the operating system 525 may use.

Although shown and described as a single host device 505 in communication with a single client device 530, it is contemplated that the host device 505 may be in operative communication with any number of client devices 530. For example, multiple client devices 530 on a network may need access to a single, common file system 520 on a host device 505. Thus, multiple client devices 530 may have access to the same file system 520 on the host device 505. However, it is contemplated that different client devices 530 may have different privileges and configurations with respect to accessing and using the host device 505, as described further herein.

When the client device 530 is rebooted, the file system 520 may be reloaded into the main memory 540, and changes that were made to the file system 520 while it was in the main memory 540 may be lost. This may make it difficult to change configuration data (e.g., file system parameters, such as an IP address). In some cases, the file system 520 may be changed in order to change the configuration data, then the updated file system 520 would be loaded. However, this process may be time consuming.

Figure 5B:
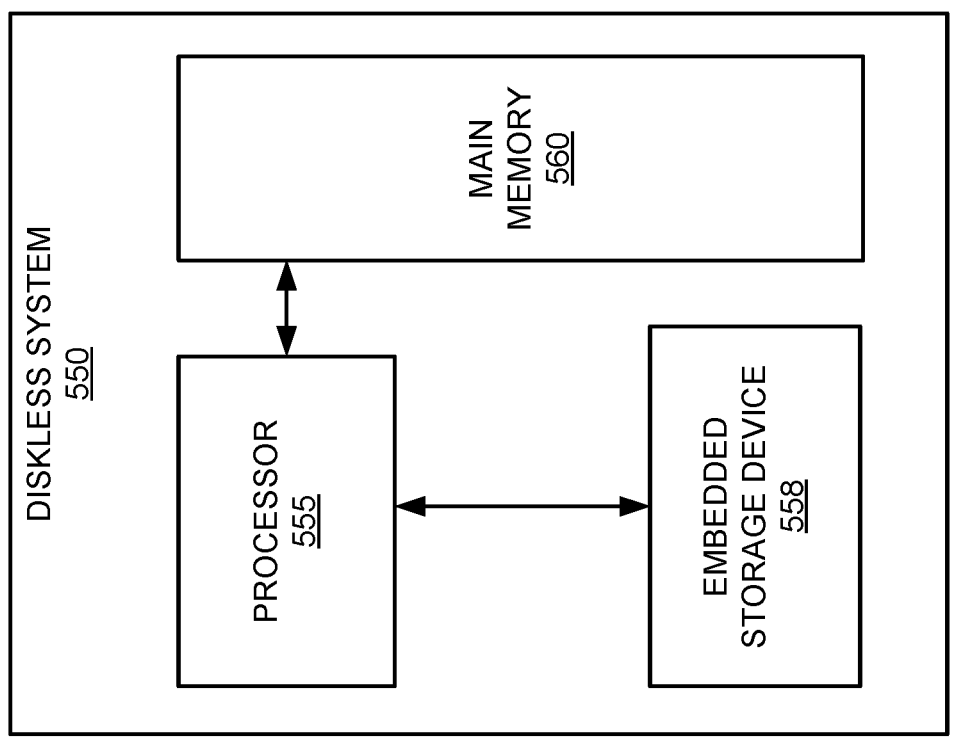
FIG. 5B is a block diagram illustrating an embedded diskless system for virtual configuration, in accordance with some embodiments.

FIG. 5B is a block diagram illustrating an embedded diskless system 550 for virtual configuration, in accordance with some embodiments. The embedded diskless system 550 may include processor 555, main memory 560, and an embedded storage device 558. Processor 555 may be similar to processor 535 of FIG. 5A. Main memory 560 may be similar to main memory 540 of FIG. 5A. However, in some embodiments, the embedded diskless system 550 may load the operating system and/or the file system from some source other than host device 505 (e.g., embedded storage device 558). Embedded storage device 558 may be, for example, a flash drive. Embedded storage device 558 may be as described above with respect to storage device 515 of FIG. 5A. Although shown as being internal to the diskless system 550, it is contemplated that embedded storage device 558 may be external to the diskless system 550 (e.g., plugged into a USB drive or other connector on the diskless system 550).

Virtual Configuration Systems and Methods

Figure 6:
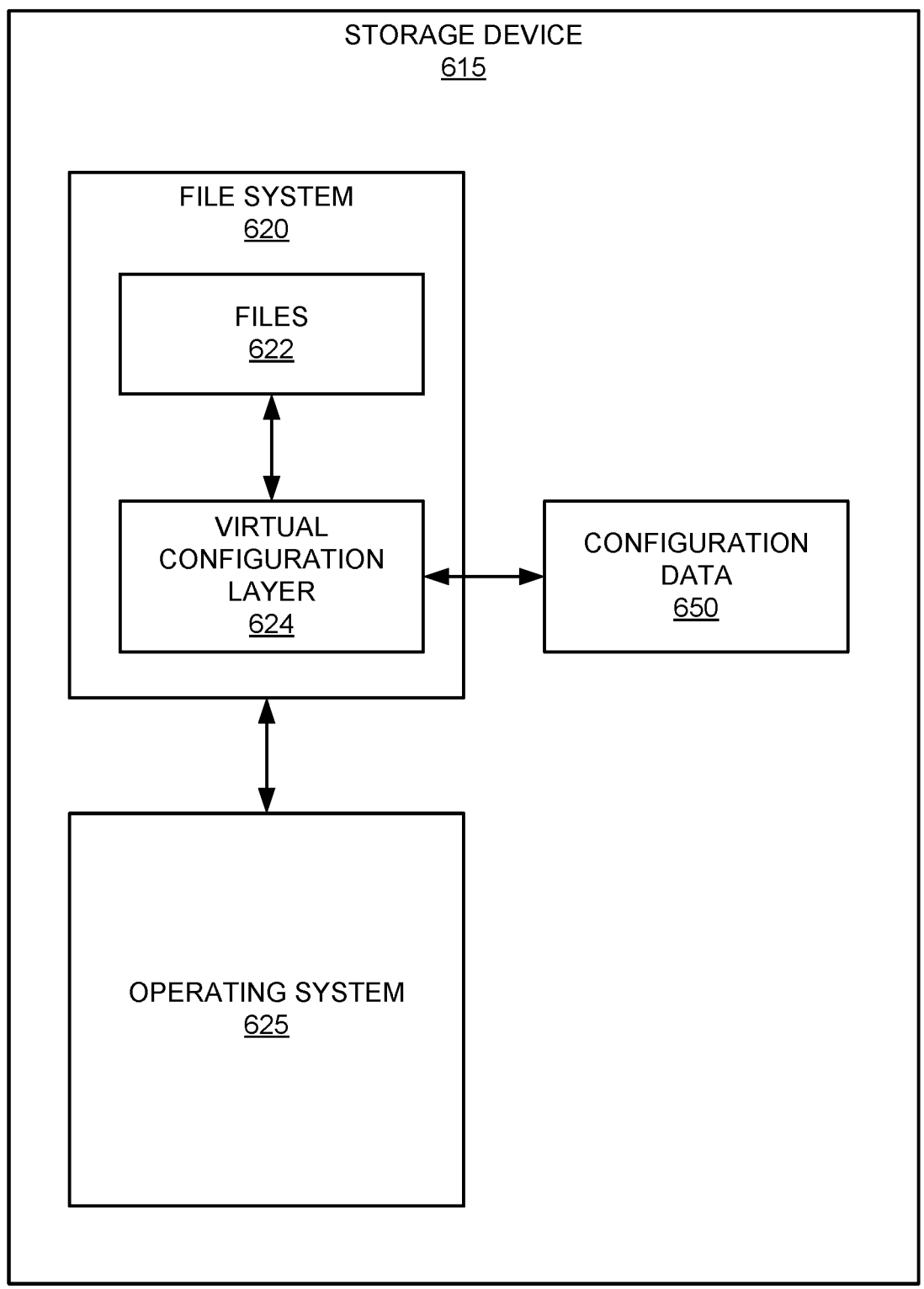
FIG. 6 is a block diagram illustrating a storage device implementing a virtual configuration layer, in accordance with some embodiments.

Thus, according to some embodiments, virtual configuration systems and methods are provided that allow for persistent configuration of the operating system of an NFS server. FIG. 6 is a block diagram illustrating a storage device 615 implementing a virtual configuration layer 624, in accordance with some embodiments. The storage device 615 may be, for example, storage device 515 of FIG. 5A, and may be implemented in the host device 505 of FIG. 5A. In another example, the storage device 615 may be embedded storage device 558 of FIG. 5B, and may be implemented in the diskless system 550 of FIG. 5B.

The storage device 615 may include a file system 620, an operating system 625, and configuration data 650. The file system 620 may be implemented as the file system 520 of FIG. 5A. The operating system 625 may be implemented as the operating system 525 of FIG. 5A. The file system 620 may include files 622 and a virtual configuration layer 624. The file system 620 and/or the operating system 625 of the storage device 615 may be configured to be accessed and loaded by a diskless system, such as client device 530 of FIG. 5A and/or diskless system 550 of FIG. 5B. Because diskless systems typically do not have their own hard drive, they depend on the host device (e.g., the host device 505 of FIG. 5) housing the storage device 615 for the use of the operating system 625 and/or the file system 620. Embedded diskless systems may depend on a non-rotating storage device, such as a flash drive, for the use of the operating system 625 and/or the file system 620.

In previous implementations, configuration data 650 would have to be onerously stored within the files 622 of the file system 620, and/or made in volatile memory such that changes to the configuration data 650 may not persist amongst successive loads. These difficulties may be attributed to the fact that configuration data associated with a particular client device cannot be persistently stored on a client device that is a diskless system.

Thus, according to some embodiments, a virtual configuration layer 624 may be added to the file system 620 that retrieves the configuration data 650 from outside of the file system 620 (e.g., in a separate datastore or in a separate area of a datastore within the storage device 615). The virtual configuration layer 624 may be in the form of a script, in some embodiments. Although shown and described as being internal to the storage device 615, it is contemplated that the configuration data 650 may alternatively or additionally be included in another storage device separate from the storage device 615 (e.g., an SD card). The configuration data 650 may include any configurable parameters of the file system 620 and/or the operating system 625, such as networking protocols and parameters, security parameters, tuning parameters, system interface settings, required modules and drivers, and the like. Some embodiments may allow the configuration data 650 to be virtualized and changed by the virtual configuration layer 624, without changing the file system 620. In some embodiments, this may be more efficient than modifying the file system 620.

Once the configuration data 650 is changed, it may be used to configure the file system 620 and/or the operating system 625 when it is loaded by a client device. The configuration data 650 may be stored persistently in nonvolatile memory such that it is not lost between successive loads and, as it is located outside of the file system 620, it does not require difficult changes to the file system 620 itself. In some embodiments, the configuration data 650 may be overwritten each time it is updated. In some embodiments, the configuration data 650 may store new versions each time it is updated, with the most recent version being loaded when the operating system 625 is booted. In embodiments in which partial changes to the configuration data 650 occur, those partial changes may be loaded in conjunction with other partial changes or in conjunction with default configuration data.

The virtual configuration layer 624 within the file system 620 may allow faster and easier changes to the configuration data 650, particularly on an embedded card. For example, testing may become easier by allowing a quick change of addressing modes to support various testing platforms. The embedded card may normally have a fixed IP address, but when hooking it up to a standalone test station, it may need a different static IP address, or a DHCP IP address.

Figure 7:
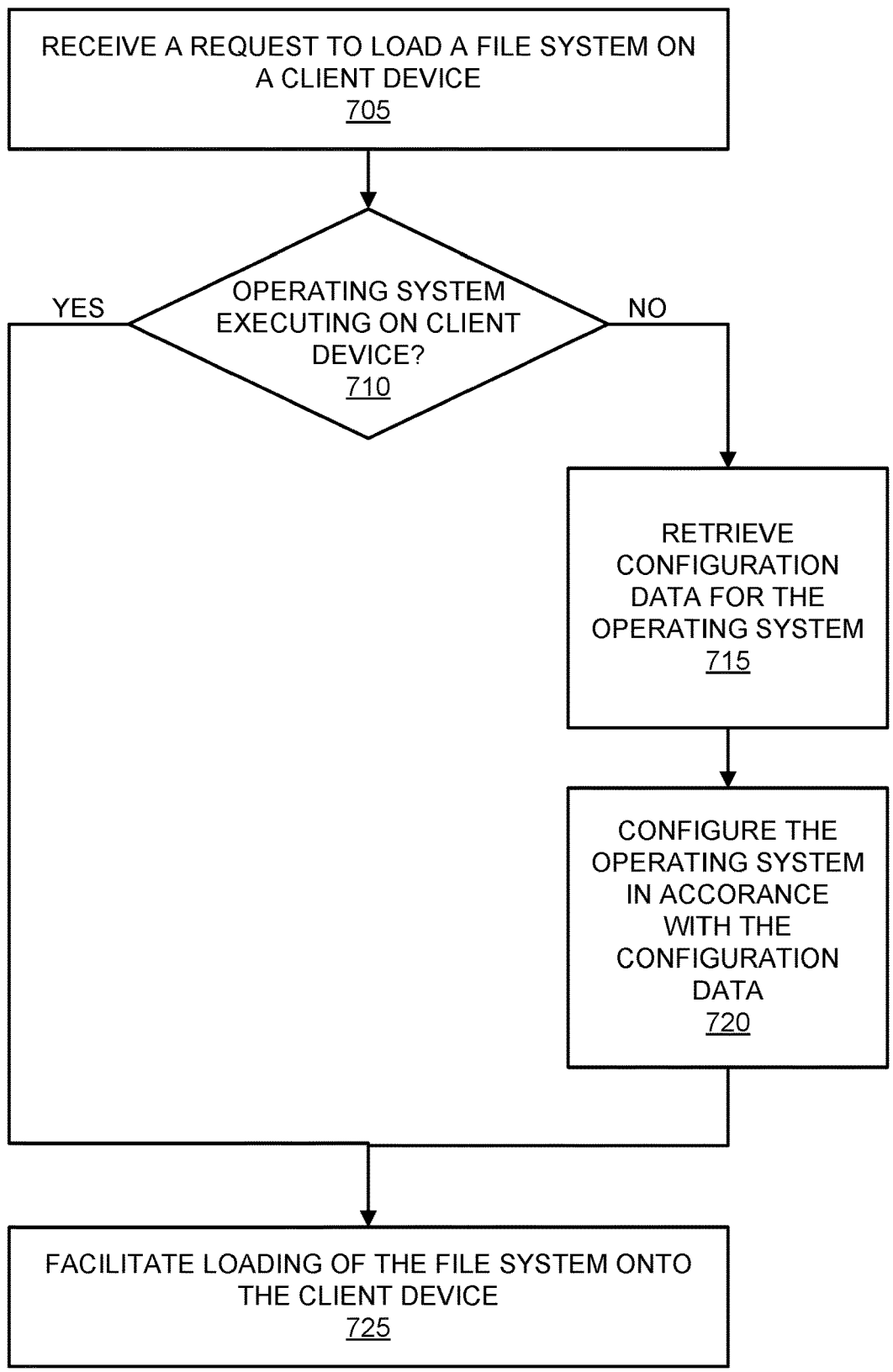
FIG. 7 is a flowchart illustrating a method for virtual configuration of an operating system loaded on a client device from a host device, in accordance with some embodiments.

Various methods may be used to implement the systems for virtual configuration as described herein. FIG. 7 is a flowchart illustrating a method for virtual configuration of an operating system loaded from a host device onto a client device, in accordance with some embodiments. The method of FIG. 7 may be implemented by the host device, for example, which may be accessible over a network by the client device.

At step 705, an operating system of a host device receives a request to load a file system from nonvolatile storage of the host device into volatile memory of a client device. The host device may be, for example, host device 405 of FIG. 4 and/or host device 505 of FIG. 5A. The file system may be, for example, file system 315 of FIG. 3, file system 420 of FIG. 4, file system 520 of FIG. 5A, and/or file system 620 of FIG. 6. The nonvolatile storage may be, for example, secondary storage 135 of FIG. 1, storage device 415 of FIG. 4, storage device 515 of FIG. 5A, and/or storage device 615 of FIG. 6. The operating system may be, for example, operating system 525 of FIG. 5A and/or operating system 625 of FIG. 6. The client device may be, for example, client device 425, 435, and/or 445 of FIG. 4, and/or client device 530 of FIG. 5. The client device may be a diskless system. The volatile memory may be main memory 130 of FIG. 1 and/or main memory 540 of FIG. 5A.

In some embodiments, the request to load the file system may include an identifier associated with the client device. For example, if the client device sent the request, the request may include its own identifier. In another example, if another device sent the request, the request may include the identifier of the client device that needs access to the file system. The identifiers associated with the client devices may be any suitable unique combination of letters, numbers, and/or symbols, including, but not limited to, names (e.g., user names, device names, etc.), IP addresses, MAC addresses, and/or the like.

In some embodiments, the identifier associated with the client device may be used by the host device for authorization and/or authentication purposes. For example, the host device may ensure that the identifier is included on a list of identifiers of client devices authorized to access the operating system and/or the file system on the host device. In another example, when the request from an entity other than the client device needing access, the identifier of the client device may be used to contact the client device to confirm that access is needed and/or to confirm that the client device has the necessary capabilities to access the operating system and/or the file system of the host device.

At step 710, in response to receiving the request, the operating system of the host device determines whether the operating system is executing on the client device. The operating system of the host device may determine whether or not it is executing on the client device by, for example, retrieving the details of occurrences of the operating system that are checked out. The details may include identifiers, such as IP addresses, of client devices that are executing the operating system. The operating system may compare the identifier of the client device requesting to load the file system (or the client device that is the subject of the request to load the file system) to the list of identifiers of client devices that are currently executing the operating system. In another example, the operating system of the host device may query the client device to determine whether the operating system is already executing on the client device.

If the operating system is not already executing on the client device, the process proceeds to step 715. At step 715, in response to determining that the operating system is not executing on the client device, the host device retrieves configuration data for the operating system from a datastore. In some embodiments, there may only be a single host device and a single client device; thus, only one set of configuration data is needed. Similarly, only one set of configuration data may be needed if the configuration data is the same for all client devices requesting to load the operating system and/or the file system from the host device.

In some embodiments, the configuration data for the operating system may be specific to a particular client device, such as when multiple client devices are loading the operating system and file system of a single host device. In these embodiments, the host device may use the identifier of the client device received with the request to access a particular set of configuration data associated with that identifier. The configuration data associated with a particular identifier may be complete (i.e., may specify configurations for each configurable feature of the operating system and/or the file system), or may be partial (i.e., may specify configurations for only some configurable features of the operating system and/or the file system). In the case of partial configuration data, in some embodiments, default configurations may be used for configurable features not specified by the configuration data.

In still other embodiments, the configuration data for the operating system may be the same across different client devices within a group of client devices, but different between different groups of client devices. For example, a certain type of client device (e.g., mobile phones) may have a first set of configuration data, while another type of client device (e.g., notebook computers) may have a different, second set of configuration data, while still another type of client device (e.g., desktop computers) may have a different, third set of configuration data. In this example, the identifier provided by the client device may not be unique and may be indicative of a particular group instead. In another example, the client device may still provide a unique identifier, with the host device storing a list of unique identifiers and associated groupings.

The configuration data may be, for example, configuration data 650 of FIG. 6. The datastore may be nonvolatile storage. In some embodiments, the datastore is located in the nonvolatile storage of the host device. In some embodiments, the datastore is located in other nonvolatile storage internal or external to the host device. The datastore may be located outside of and be separate from the file system.

At step 720, further in response to determining that the operating system is not executing on the client device, the host device may configure the operating system in accordance with the configuration data. For example, the configuration data may include addressing information (e.g., IP addresses) used by the operating system. The host device may configure the operating system with this addressing information, such that the operating system is up-to-date, current, and reflect the most recent configuration changes. Although described with respect to addressing information, however, it is contemplated that the configuration data may include details of any configurable parameters of the operating system and/or the file system.

At step 725, the host device facilitates loading of the file system into the volatile memory of the client device. The operating system is executing while the file system is loaded on the client device. In embodiments in which the operating system was not already executing on the client device at step 710, the operating system may be configured and up-to-date, and executing and loading the file system in accordance with the configuration data.

In embodiments in which the operating system was already executing on the client device at step 710, the host device facilitates loading of the file system into the volatile memory of the client device without configuring the operating system. The operating system may be configured upon the next termination and reloading of the operating system by the client device, as described further herein.

In some embodiments, the host device may receive a request to update the configuration data for the operating system. For example, a client device may specify a new IP address at which the operating system may locate a resource. The host device may update the configuration data for the operating system in the datastore located outside of the file system.

The operating system can be configured upon the next loading of the operating system of the client device. For example, to update the configuration of the operating system or for any purpose, the host device may facilitate termination of the operating system and the file system on the client device. In some embodiments, because the configuration data is stored in datastore included in nonvolatile storage, the configuration data may be maintained during termination of the operating system and the file system of the client device.

After termination of the operating system on the client device, the operating system may receive a request to reload the file system into the volatile memory of the client device. The operating system may be configured for this instance before loading on the client device. For example, in response to receiving the request, the host device may retrieve the updated configuration data for the operating system from the datastore located outside of the file system. The host device may configure the operating system in accordance with the updated configuration data. The host device may facilitate reloading of the file system into the volatile memory of the client device. The operating system may be executing while the file system is reloaded on the client device. The operating system may be executing and the file system may be reloaded in accordance with the updated configuration data.

Figure 8:
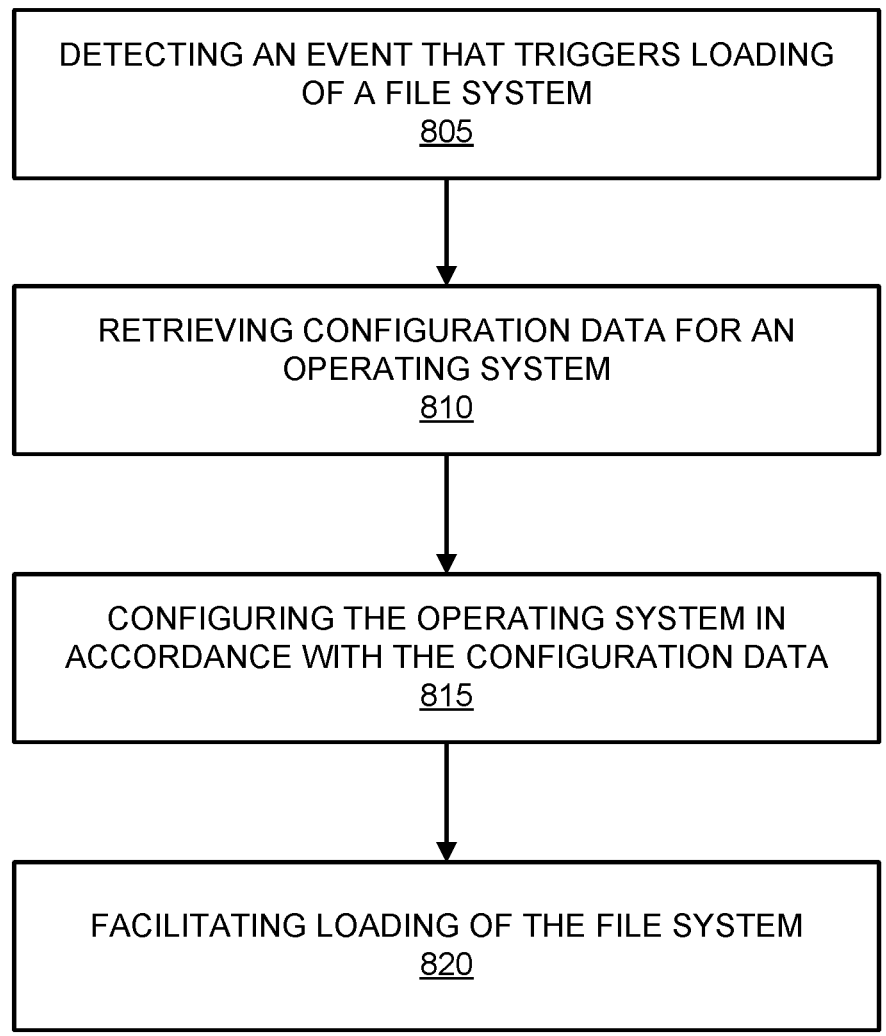
FIG. 8 is a flowchart illustrating a method for virtual configuration of an operating system loaded on an embedded diskless system, in accordance with some embodiments.

FIG. 8 is a flowchart illustrating a method for virtual configuration of an operating system loaded from an embedded storage device onto a diskless system, in accordance with some embodiments. The method of FIG. 8 may be implemented by the diskless system, for example, which may be in operable wired or wireless communication with the embedded storage device.

At step 805, an event is detected that triggers loading of a file system from nonvolatile storage into volatile memory of the diskless system. The file system may be, for example, file system 315 of FIG. 3, file system 420 of FIG. 4, file system 520 of FIG. 5A, and/or file system 620 of FIG. 6. The nonvolatile storage may be, for example, secondary storage 135 of FIG. 1, storage device 415 of FIG. 4, storage device 515 of FIG. 5A, embedded storage device 558 and/or storage device 615 of FIG. 6. The volatile memory may be main memory 130 of FIG. 1, main memory 540 of FIG. 5A, and/or main memory 560 of FIG. 5B. The diskless system may be, for example, diskless system 550 of FIG. 5B. The nonvolatile storage may be embedded in the diskless system. In some embodiments, the event may be a powering on of the diskless system.

In some embodiments, the event may be a request to load the file system. The request to load the file system may include an identifier associated with the diskless system. For example, if the diskless system executed a command requesting the file system, the request may include its own identifier. The identifier associated with the diskless system may be any suitable unique combination of letters, numbers, and/or symbols, including, but not limited to, names (e.g., user names, device names, etc.), IP addresses, MAC addresses, and/or the like.

In some embodiments, the identifier associated with the diskless system may be matched to stored identifiers on the embedded storage device for authorization and/or authentication purposes. For example, the diskless system may query a database of identifiers stored on the embedded storage device with its own identifier to ensure that it is authorized to access the operating system and/or the file system on the embedded storage device. In some embodiments, the diskless system may further query the database of identifiers stored on the embedded storage device with its own identifier to confirm that the diskless system has the necessary capabilities to access the operating system and/or the file system stored on the embedded storage device.

At step 810, in response to detecting the event, configuration data for an operating system may be retrieved from a datastore. The operating system may be, for example, operating system 525 of FIG. 5A and/or operating system 625 of FIG. 6. In some embodiments, the embedded storage device is configured to be used with only one diskless system. Thus, only one set of configuration data is needed (i.e., the configuration data used by the diskless system). Similarly, only one set of configuration data may be needed of the configuration data is the same for all diskless systems (or other systems) that may load the operating system and/or the file system from the host device.

In some embodiments, the configuration data for the operating system may be specific to a particular diskless system, such as when multiple diskless systems load the operating system and file system from a single storage device. In these embodiments, the storage device may use the identifier of the diskless system received with the request to access a particular set of configuration data associated with that identifier. The configuration data associated with a particular identifier may be complete (i.e., may specify configurations for each configurable feature of the operating system and/or the file system), or may be partial (i.e., may specify configurations for only some configurable features of the operating system and/or the file system). In the case of partial configuration data, in some embodiments, default configurations or previous configurations may be used for configurable features not specified by the configuration data.

In still other embodiments, the configuration data for the operating system may be the same across different diskless systems within a group of diskless systems, but different between different groups of diskless systems. For example, a certain type of diskless system (e.g., mobile phones) may have a first set of configuration data, while another type of diskless system (e.g., notebook computers) may have a different, second set of configuration data, while still another type of diskless system (e.g., desktop computers) may have a different, third set of configuration data. In this example, the identifier provided by the diskless system may not be unique and may be indicative of a particular group instead. In another example, the diskless system may still provide a unique identifier, with the storage device storing a list of unique identifiers and associated groupings.

The configuration data may be, for example, configuration data 650 of FIG. 6. The datastore may be nonvolatile storage. In some embodiments, the datastore is located in the embedded storage device. In some embodiments, the datastore is located in other nonvolatile storage internal or external to the embedded storage device. The datastore may be located outside of and be separate from the file system. The operating system may be stored in the nonvolatile storage.

At step 815, further in response to detecting the event, the operating system may be configured in accordance with the configuration data. For example, the configuration data may include addressing information (e.g., IP addresses) used by the operating system. The operating system may be configured with this addressing information, such that the operating system is up-to-date, current, and reflect the most recent configuration changes. Although described with respect to addressing information, however, it is contemplated that the configuration data may include details of any configurable parameters of the operating system and/or the file system.

In some embodiments, the event is detected by the operating system while the operating system is executing on the diskless system. In response to detecting the event, and after the configuration data is retrieved, the operating system may be reloaded in accordance with the configuration data. The reloading of the operating system may cause the operating system to be reconfigured in accordance with the configuration data. In some embodiments, in response to detecting the event, and after the configuration data is retrieved, the operating system may be reconfigured in accordance with the configuration data without reloading the operating system. For example, an IP address associated with a resource may be changed and updated in real time, without requiring a reboot.

At step 820, the file system is loaded into the volatile memory of the client device. The operating system is executing while the file system is loaded on the client device. In some embodiments, the diskless system may request to update the configuration data for the operating system. For example, the diskless system may specify a new IP address at which the operating system may locate a resource. The diskless system may update the configuration data for the operating system in the datastore located outside of the file system.

In some embodiments, the operating system can be configured with the update upon the next loading of the operating system on the diskless system. For example, to update the configuration of the operating system or for any purpose, the diskless system may terminate execution of the operating system and the file system on the diskless system. In some embodiments, because the configuration data is stored in the datastore included in nonvolatile storage, the configuration data may be maintained during termination of the operating system and the file system of the diskless system.

After termination of the operating system on the diskless system, the operating system may receive a request to reload the file system into the volatile memory of the diskless system. The operating system may be configured for this instance before loading on the diskless system. For example, the diskless system may retrieve the updated configuration data for the operating system from the datastore located outside of the file system. The diskless system may configure the operating system in accordance with the updated configuration data. The diskless system may facilitate reloading of the tile system into the volatile memory of the diskless system. The operating system may be executing while the file system is reloaded on the diskless system. The operating system may be executing and the file system may be reloaded in accordance with the updated configuration data.

Thus, according to some embodiments, changes to configuration data of an operating system and/or a file system may persist across future loads of the file system. Further, these changes may not require that the file system itself be changed, as the configuration data may be stored externally from the file system.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method comprising:
   receiving, at a host device, configuration data that corresponds to a configuration of a first instance of an operating system executed by a client device, the configuration data including at least one modification to the first instance of the operating system introduced by the client device during execution of the first instance of the operating system by the client device;
   storing the configuration data in a datastore that is located outside of a file system of the host device;
   receiving, at a second instance of the operating system executing on the host device, a request to load a file system from nonvolatile storage of the host device into volatile memory of the client device;
   in response to receiving the request, retrieving information corresponding to one or more instances of the operating system that have been checked out;
   determining, using the information and by the second instance of the operating system, that an instance of the operating system of the one or more instances of the operating system is not executing on the client device;
   in response to determining that an instance of the operating system of the one or more instances of the operating system is not executing on the client device:
      retrieving, by the host device, the configuration data from a datastore, the configuration data including the at least one modification; and configuring, by the host device, a particular instance of the operating system of the one or more instances of the operating system in accordance with the configuration data; and facilitating, by the host device, loading of the file system into the volatile memory of the client device, wherein the particular instance of the operating system of the one or more instances of the operating system is executing while the file system is loaded on the client device.

2. The method of claim 1, further comprising:

receiving, by the host device, an update request to update the configuration data for the particular instance of the operating system; and updating, by the host device, the configuration data for the particular instance of the operating system in the datastore located outside of the file system.

3. The method of claim 2, further comprising:

facilitating, by the host device, termination of the particular instance of the operating system and the file system on the client device, wherein the configuration data is maintained in the datastore during termination of the particular instance of the operating system and the file system on the client device.

4. The method of claim 3, further comprising:

receiving, at the second instance of the operating system of the host device, a reload request to reload the file system into the volatile memory of the client device;

in response to receiving the reload request, retrieving, by the host device, the configuration data from the datastore located outside of the file system;

configuring, by the host device, a new instance of the operating system in accordance with the configuration data; and facilitating, by the host device, reloading of the file system into the volatile memory of the client device, wherein the new instance of the operating system is executing while the file system is reloaded on the client device.

5. The method of claim 1, wherein the datastore is nonvolatile.

6. The method of claim 1, wherein the datastore is located in the nonvolatile storage of the host device.

7. The method of claim 1, wherein the client device is a diskless system.

8. A computer-program product tangibly embodied in a non-transitory machine-readable storage medium of a host device, including instructions that, when executed by one or more processors, cause the one or more processors to:

receive configuration data that corresponds to a configuration of a first instance of an operating system executed by a client device, the configuration data including at least one modification to the first instance of the operating system introduced by the client device during execution of the first instance of the operating system by the client device;

store the configuration data in a datastore that is located outside of a file system of the host device;

receive, at a second instance of the operating system executing on the host device, a request to load a file system from nonvolatile storage of the host device into volatile memory of the client device;

in response to receiving the request, retrieving information corresponding to one or more instances of the operating system that have been checked out;

determine, by the second instance of the operating system and using the information, that an instance of the operating system of the one or more instances of the operating system is not executing on the client device;

in response to determining that an instance of the operating system of the one or more instances of the operating system is not executing on the client device:

retrieve, by the host device, the configuration data from the datastore, the configuration data including the at least one modification; and configure, by the host device, a particular instance of the operating system of the one or more instances of the operating system in accordance with the configuration data; and facilitate, by the host device, loading of the file system into the volatile memory of the client device, wherein the particular instance of the operating system of the one or more instances of the operating system is executing while the file system is loaded on the client device.

9. The computer-program product of claim 8, wherein the instructions further cause the one or more processors to:

receive, by the host device, an update request to update the configuration data for the particular instance of the operating system; and update, by the host device, the configuration data for the particular instance of the operating system in the datastore located outside of the file system.

10. The computer-program product of claim 9, wherein the instructions further cause the one or more processors to:

facilitate, by the host device, termination of the particular instance of the operating system and the file system on the client device, wherein the configuration data is maintained in the datastore during termination of the particular instance of the operating system and the file system on the client device.

11. The computer-program product of claim 10, further comprising:

receiving, at the second instance of the operating system of the host device, a reload request to reload the file system into the volatile memory of the client device;

in response to receiving the reload request, retrieving, by the host device, the configuration data from the datastore located outside of the file system;

configuring, by the host device, a new instance of the operating system in accordance with the configuration data; and facilitating, by the host device, reloading of the file system into the volatile memory of the client device, wherein the a new instance of the operating system is executing while the file system is reloaded on the client device.

12. The computer-program product of claim 8, wherein the datastore is nonvolatile.

13. The computer-program product of claim 8, wherein the datastore is located in the nonvolatile storage of the host device.

14. The computer-program product of claim 8, wherein the client device is a diskless system.

15. A system comprising:

one or more processors;

a non-transitory machine-readable storage medium, including instructions that, when executed by the one or more processors, cause the one or more processors to perform operations including:

receive configuration data that corresponds to a configuration of a first instance of an operating system executed by a client device, the configuration data including at least one modification to the first instance of the operating system introduced by the client device during execution of the first instance of the operating system by the client device;

store the configuration data in a datastore that is located outside of a file system;

receiving, at a second instance of the operating system, a request to load a file system from nonvolatile storage into volatile memory of the client device;

in response to receiving the request, retrieving information corresponding to one or more instances of the operating system that have been checked out;

determining, by the second instance of the operating system and using the information, that an instance of the operating system of the one or more instances of the operating system is not executing on the client device;

in response to determining that the an instance of the operating system of the one or more instances of the operating system is not executing on the client device:

retrieving the configuration data from the datastore, the configuration data including the at least one modification; and configuring a particular instance of the operating system of the one or more instances of the operating system in accordance with the configuration data; and facilitating loading of the file system into the volatile memory of the client device, wherein the particular instance of the operating system of the one or more instances of the operating system is executing while the file system is loaded on the client device.

16. The system of claim 15, further comprising:

receiving an update request to update the configuration data for the particular instance of the operating system; and updating the configuration data for the particular instance of the operating system in the datastore located outside of the file system.

17. The system of claim 16, further comprising:

facilitating termination of the particular instance of the operating system and the file system on the client device, wherein the configuration data is maintained in the datastore during termination of the particular instance of the operating system and the file system on the client device.

18. The system of claim 15, further comprising:

receiving, at the second instance of the operating system, a reload request to reload the file system into the volatile memory of the client device;

in response to receiving the reload request, retrieving the configuration data from the datastore located outside of the file system;

configuring a new instance of the operating system in accordance with the configuration data; and facilitating reloading of the file system into the volatile memory of the client device, wherein the new instance of the operating system is executing while the file system is reloaded on the client device.

19. The method of claim 1, wherein the information indicates a count of the one or more instances of the operating system that have been checked out.

20. The computer-program product of claim 8, wherein the information indicates a count of the one or more instances of the operating system that have been checked out.

* * * * *

UNITED STATES PATENT AND TRADEMARK OFFICE
CERTIFICATE OF CORRECTION

PATENT NO. : 10,754,829 B2
APPLICATION NO. : 15/479085
DATED : August 25, 2020
INVENTOR(S) : West et al.

Page 1 of 1

It is certified that error appears in the above-identified patent and that said Letters Patent is hereby corrected as shown below:

In the Drawings

On sheet 8 of 9, in FIG. 7, under Reference Numeral 720, Line 3, delete "ACCORANCE" and insert -- ACCORDANCE --, therefor.

In the Claims

In Column 20, Line 48, in Claim 11, delete "the a" and insert -- the --, therefor.

In Column 21, Line 18, in Claim 15, delete "the an" and insert -- an --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*